United States Patent [19]

Reynolds

[11] Patent Number: 5,383,374
[45] Date of Patent: Jan. 24, 1995

[54] COUNTERSHAFT DRIVEN AUXILIARY DRIVE UNIT

[75] Inventor: Joseph D. Reynolds, Climax, Mich.

[73] Assignee: Eaton Corporation, Cleveland, Ohio

[21] Appl. No.: 58,166

[22] Filed: May 5, 1993

[51] Int. Cl.$^6$ .................................................. F16H 37/00
[52] U.S. Cl. ............................... 74/15.66; 74/15.86; 74/745
[58] Field of Search ................. 74/11, 15.6, 15.66, 74/15.86, 745

[56] References Cited

U.S. PATENT DOCUMENTS

| | | | |
|---|---|---|---|
| 2,761,322 | 9/1956 | Ronan | 74/15.86 |
| 2,958,225 | 11/1960 | Wagner | 74/15.4 |
| 3,830,111 | 8/1974 | Travaglio | 74/15.4 |
| 4,388,843 | 6/1983 | Teeter | 74/745 |

Primary Examiner—John T. Kwon
Assistant Examiner—Michael Lee
Attorney, Agent, or Firm—L. J. Kasper; Howard D. Gordon

[57] ABSTRACT

A compound change gear transmission (11) is disclosed, of the type including a front main transmission section (13), and a rear auxiliary transmission section (15). The front section includes a countershaft (29) and a rear section includes a rear wall portion (33). A power-take-off (PTO) device (61;141) includes a PTO input shaft (81) extending through the rear wall portion (33) and being clutched (85) to a rearward end portion (73) of the front section countershaft (29). The PTO device includes an actuator (109,115) extending through the rear wall portion (33) and operable to move the clutch means (85) between disengaged and engaged positions. In one embodiment (FIG. 6), the PTO device (141) includes a gear train comprising a ring gear (145) and a pinion gear (167) which drives a PTO output yoke (161). The present invention provides a PTO device and clutching arrangement which is substantially reduced in overall size and complexity, and reduces the overall installed length of the transmission.

23 Claims, 5 Drawing Sheets

COUNTERSHAFT DRIVEN AUXILIARY DRIVE UNIT

BACKGROUND OF THE DISCLOSURE

The present invention relates to compound change gear vehicular transmissions of the type having an auxiliary section connected in series with a mechanical main transmission section. More particularly, the present invention relates to such a transmission of the type in which at least one of the sections, and preferably whichever section comprises the front section, is of the multi-countershaft type.

Furthermore, the present invention relates to vehicular transmissions of the type described above, in which it is desired to provide the transmission with some sort of power-take-off (PTO) capability, whereby engine horsepower which is transmitted through the transmission is available for driving some sort of auxiliary device. For example, a truck equipped with a transmission of the type to which the invention relates may also include a device such as a winch, a tailgate, a post hole digger, a dump body, etc., which may be operated by the vehicle driver while the truck is stationary and the engine is running.

Although the present invention may be utilized in various types of change gear transmissions, it is especially suited for use in a transmission including a front, mechanical main transmission section, and a rear, auxiliary section. By way of example only, the rear, auxiliary section could comprise a range box. Furthermore, the present invention is especially suited for use in such a transmission in which the front transmission section is of the twin countershaft type, and will be described in connection therewith. Twin (i.e., multiple, substantially identical) countershaft transmissions of the general type to which the present invention relates are well known in the art and are illustrated and described in detail in U.S. Pat. No. 3,105,395, assigned to the assignee of the present invention and incorporated herein by reference.

In a known, prior-art, PTO arrangement for use with a twin countershaft transmission, one of the countershafts is provided with a permanent, fixed shaft extension member which extends axially from the end of the front section countershaft through the rear section, and out through the rear wall of the transmission rear section. The PTO device is then mounted on the rear wall of the transmission rear section, with the input to the PTO device being the front section countershaft extension member.

Although such a prior art arrangement is generally acceptable, functionally, the arrangement has certain drawbacks. As is well known to those skilled in the art, it is not acceptable to have the PTO device in continuous engagement with its input (the countershaft extension member), and typically, PTO devices include some sort of arrangement for declutching the PTO relative to its input. The result of the prior art arrangement is that the total PTO package connected to the exterior of the rear wall of the transmission is quite large and cumbersome. As a further result, the PTO package increases the "installed length" of the overall transmission, such that in certain short wheel base vehicles, the particular transmission and PTO assembly cannot be used. Instead, it becomes necessary to use what is known in the art as a "side mount" PTO, thus increasing the overall lateral dimension of the transmission and PTO assembly.

Another disadvantage of the known, prior art arrangement is the necessity for a separate oil pump, typically driven off the PTO input shaft, to provide a flow of lubricant to the PTO gear set. The need for a lube pump, dedicated to the PTO device, adds further to the overall size, complexity, and expense of the PTO arrangement.

SUMMARY OF THE INVENTION

Accordingly, it is an object of the present invention to provide an improved compound transmission and PTO arrangement, wherein the overall size and complexity of the PTO device which must be added to the exterior of the transmission housing, is substantially reduced.

The above and other objects of the invention are accomplished by the provision of a compound change gear transmission of the type comprising a change gear main transmission section connected in series with an auxiliary transmission section. One of the main and auxiliary transmission sections comprises a front section, and the other comprises a rear section. The front section comprises a transmission input shaft, and at least one countershaft, constantly driven by the transmission input shaft. The rear section comprises a transmission output shaft rotatably disposed within a rear section housing, and the rear section housing includes a rear wall portion. A power take-off device is mounted to the rear wall portion, and adapted to receive input torque from the front section countershaft.

The improved transmission is characterized by the power take-off device including a power-take-off input shaft extending generally axially, through the rear wall portion, and including a forward end portion, disposed adjacent a rearward end portion of the front section countershaft. A clutch means is operably associated with the rearward end portion of the front section countershaft, and the forward end portion of the power-take-off shaft, and is movable between a first position permitting relative rotation between the countershaft and the power-take-off input shaft, and a second position connecting the power-take-off input shaft for rotation with the countershaft. The power-take-off device includes actuator means extending through the rear wall portion, operably associated with the clutch means, and operable in response to the presence of an input signal to move the clutch means from the first position to the second position.

DESCRIPTION OF THE PREFERRED EMBODIMENTS

Figure 1:
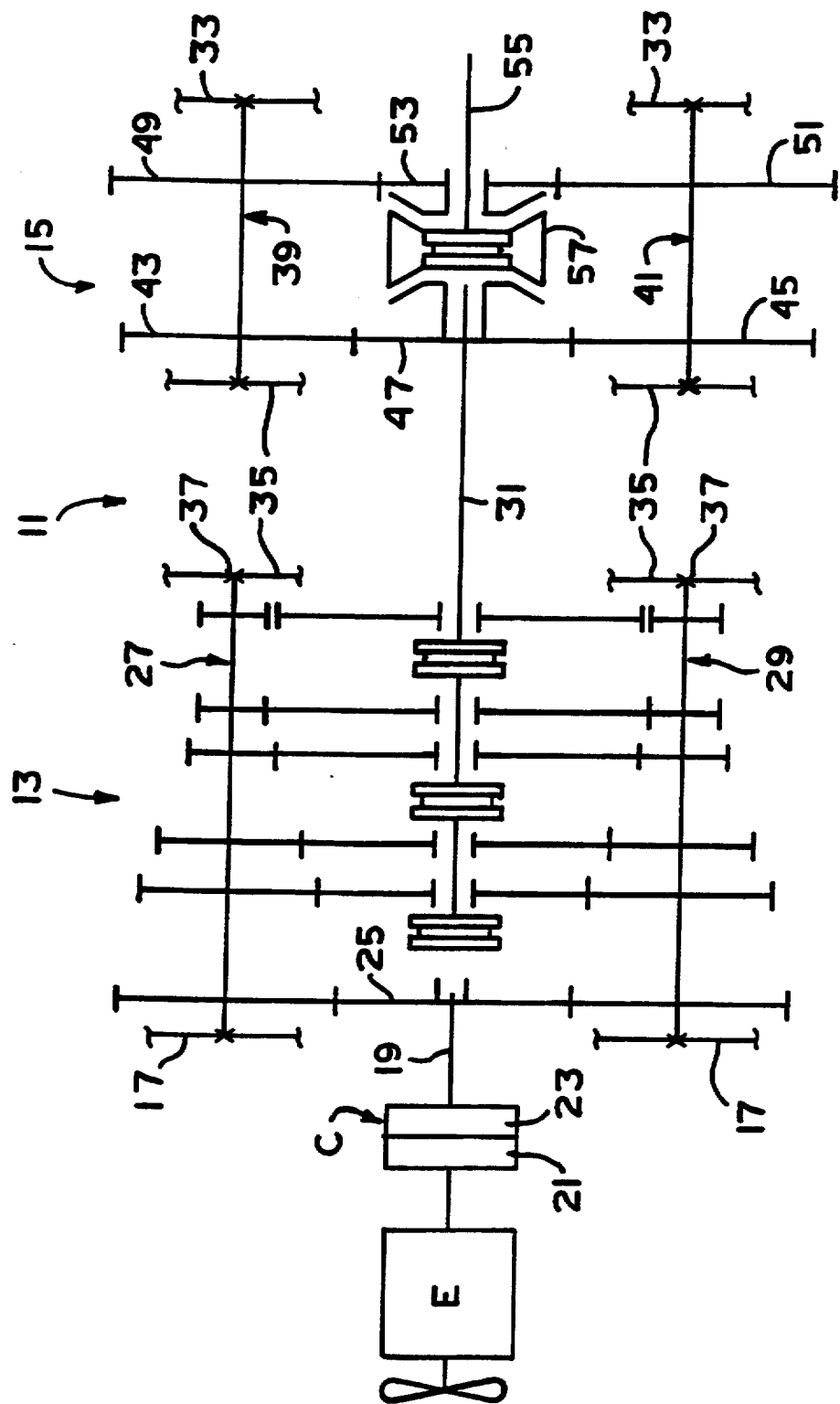
FIG. 1 is a schematic illustration of a compound change gear transmission of the type with which the present invention may be utilized.

Certain terminology will be used in the following description for convenience only and will not be limiting. The words such as "upwardly", "downwardly", "rightwardly", and "leftwardly" will designate directions in the drawings to which reference is made. Words such as "forward" and "rearward" will refer respectively to the front and rear ends of the transmission as conventionally mounted in a vehicle, being from left and right sides, respectively, of the transmission as illustrated in the drawing figures. The words "inwardly" and "outwardly" will refer to directions toward and away from, respectively, the geometric center of the device, or an axis of rotation of the element to which reference is being made. Such terminology includes the words specifically mentioned above, as well as derivatives thereof and words of similar meaning.

The term "compound transmission" is used to designate a change speed or change gear transmission having a main transmission section and an auxiliary transmission section, connected in series, whereby the selected gear reduction in the main transmission section may be compounded by further selected gear reduction in the auxiliary transmission section. Although the use of the present invention is not strictly limited to a compound transmission, the invention is especially advantageous when used with a compound transmission, and will be described in connection therewith. Several typical compound transmission configurations are illustrated and described both schematically and structurally in U.S. Pat. No. 4,788,889, assigned to the assignee of the present invention and incorporated herein by reference.

Referring now primarily to FIG. 1, which is not intended to limit the invention, there is illustrated schematically a range type compound change gear mechanical transmission, generally designated 11. The transmission 11 is a ten forward speed transmission comprising a front, main transmission section 13, and a rear, auxiliary transmission section 15. Although, in the subject embodiment, the main transmission section 13 comprises the "front" section, and the auxiliary transmission section 15 comprises the "rear" section 15, the invention is not so limited.

Typically, the transmission 11 is housed within a housing 17, and includes an input shaft 19, driven by a prime mover, such as a vehicle engine E through a selectively disengaged, normally engaged friction-type master clutch C. As is well known to those skilled in the art, the clutch C has an input or driving portion 21, drivingly connected to the engine crank shaft, and an output or driven portion 23, rotatably fixed to the transmission input shaft 19.

In the main transmission section 13, the input shaft 19 carries an input gear 25 for simultaneously driving a pair of substantially identical countershaft assemblies, generally designated 27 and 29. The reference numbers 27 and 29 will also be used hereinafter to refer specifically to the countershafts themselves. The countershafts 27 and 29 are provided on diametrically opposite sides of a main shaft 31, which is generally coaxially aligned with the input shaft 19.

Figure 2:
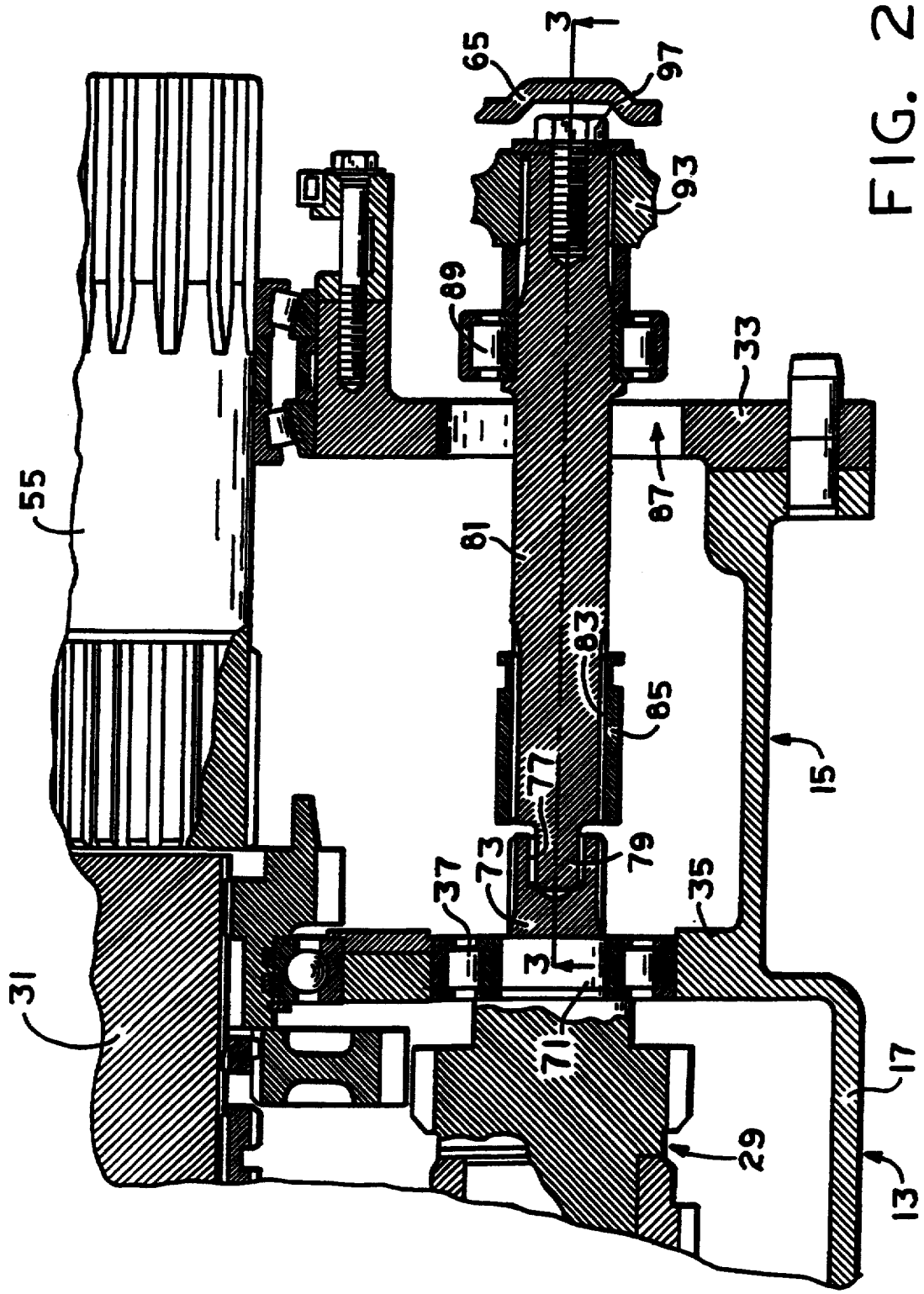
FIG. 2 is a fragmentary, generally horizontal axial cross-section of a portion of the compound transmission shown schematically in FIG. 1, including the PTO arrangement of the present invention, shown fragmentarily.
Figure 3:
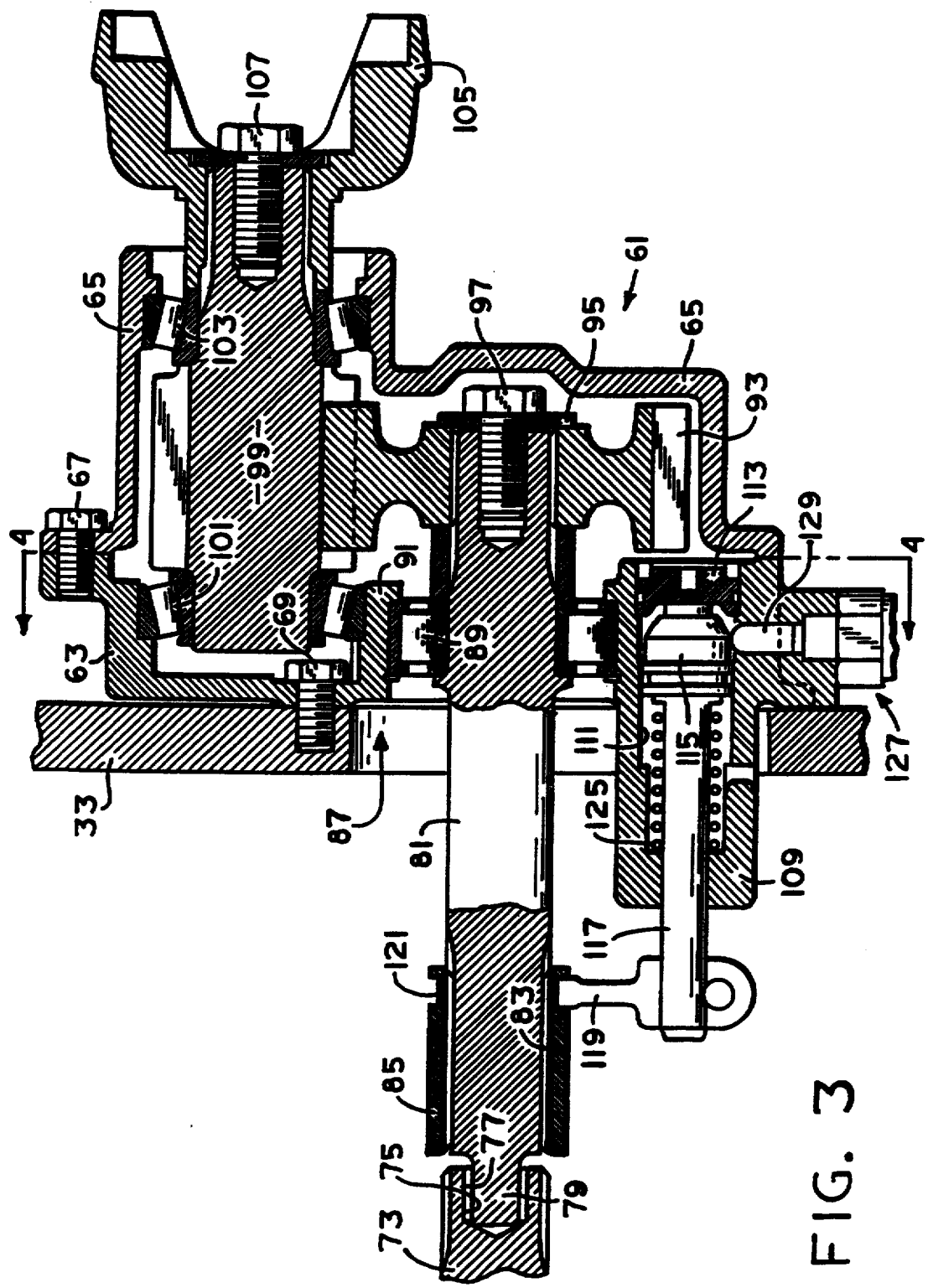
FIG. 3 is a fragmentary, axial cross-section, taken generally on line 3—3 of FIG. 2, and on a larger scale.
Figure 5:
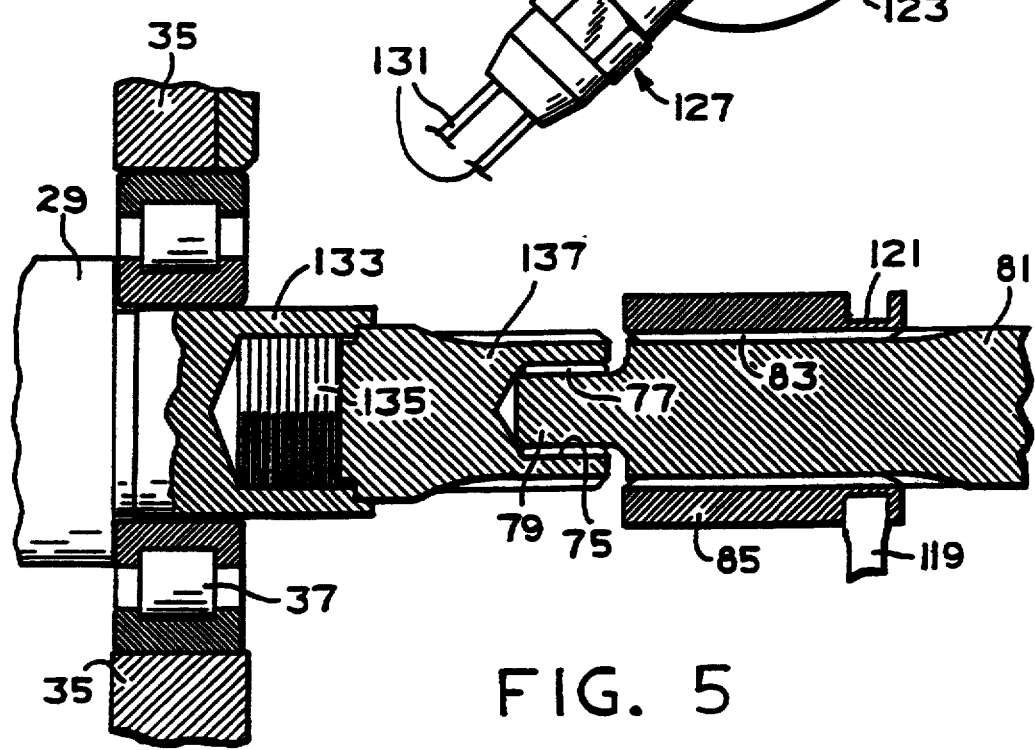
FIG. 5 is a fragmentary, further enlarged view, similar to FIGS. 2 and 3, illustrating an alternative embodiment of the present invention.

The housing 17 typically includes a rear wall portion, schematically designated 33 in FIG. 1 but illustrated structurally in FIGS. 2 and 3. Disposed intermediate, axially, the front wall of the housing 17 and the rear wall portion 33 is an intermediate wall portion 35, which is shown schematically in FIG. 1 as comprising two separate wall portions but which, as is well known to those skilled in the art, structurally comprises a single wall portion, and is shown structurally in FIGS. 2 and 5. The countershafts 27 and 29 are rotatably supported, relative to the housing 17 and intermediate wall portion 35 by suitable bearings, the bearings in the wall portion 35 being designated by the reference numeral 37. By way of reference, the bearings 37, supporting the countershaft 29, are shown in FIGS. 2 and 5.

The various countershaft gears disposed on the countershafts 27 and 29, and the various main shaft gears disposed on the main shaft 31 will not be referenced or described herein, in view of the above incorporation of U.S. Pat. No. 4,788,889. Similarly, the various sliding clutch collars, used for selective clutching of the main shaft gears, will not be referenced or described herein. Finally, the various control mechanisms, including shift forks and the shift bar housing assembly used to control the sliding clutch collars will also not be referenced or described herein.

Referring still to FIG. 1, the auxiliary transmission section 15 includes a pair of substantially identical, auxiliary countershaft assemblies 39 and 41, and the reference numerals 39 and 41 will also be used hereinafter to refer to the countershafts themselves. The countershafts 39 and 41, which are shown only in FIG. 1, are rotatably supported relative to the intermediate wall portion 35 and rear wall portion 33 by suitable bearing sets. The countershafts 39 and 41 carry auxiliary section countershaft gears 43 and 45, respectively, fixed for rotation therewith. The gears 43 and 45 are constantly meshed with, and support, auxiliary section range gear 47 which rotates with the main shaft 31. Auxiliary countershaft gears 49 and 51 are also fixed to, and rotate with, the countershafts 39 and 41, respectively, and are constantly meshed with, and support range/output gear 53.

A synchronized sliding jaw clutch collar 57 is fixed for rotation to the output shaft 55 and is utilized selectively to couple either the range gear 47 or the output gear 53 to the output shaft 55. The output gear 53 is connected to the output shaft 55 only when the synchronizer 57 is shifted rearward. The structure and function of the auxiliary transmission section 15 is also now well known to those skilled in the art, and will not be described in any further detail, again partly in view of the above incorporation of U.S. Pat. No. 4,788,889.

As is also well known to those skilled in the art, and is especially relevant to the present invention, the input shaft 19 and the input gear 25 are always rotating, whenever the engine E is running and the driving and driven portions 21 and 23 of the clutch C are frictionally engaged. Whenever the input gear 25 is rotating, both of the countershafts 27 and 29 are rotating. However, depending upon the condition of the shift control mechanism for shifting the clutch collars in the main transmission section 13, the mainshaft 31 may or may not be rotating. For example, with the shift mechanism in its neutral position, none of the mainshaft gears are clutched to the mainshaft 31, and therefore, the mainshaft 31 is not rotating. Whenever the mainshaft 31 is not rotating, the countershafts 39 and 41 in the auxiliary section 15 are not rotating, and similarly, none of the gears 43, 45, 47, 49, 51, and 53 is rotating, assuming the vehicle is stationary.

Figure 4:
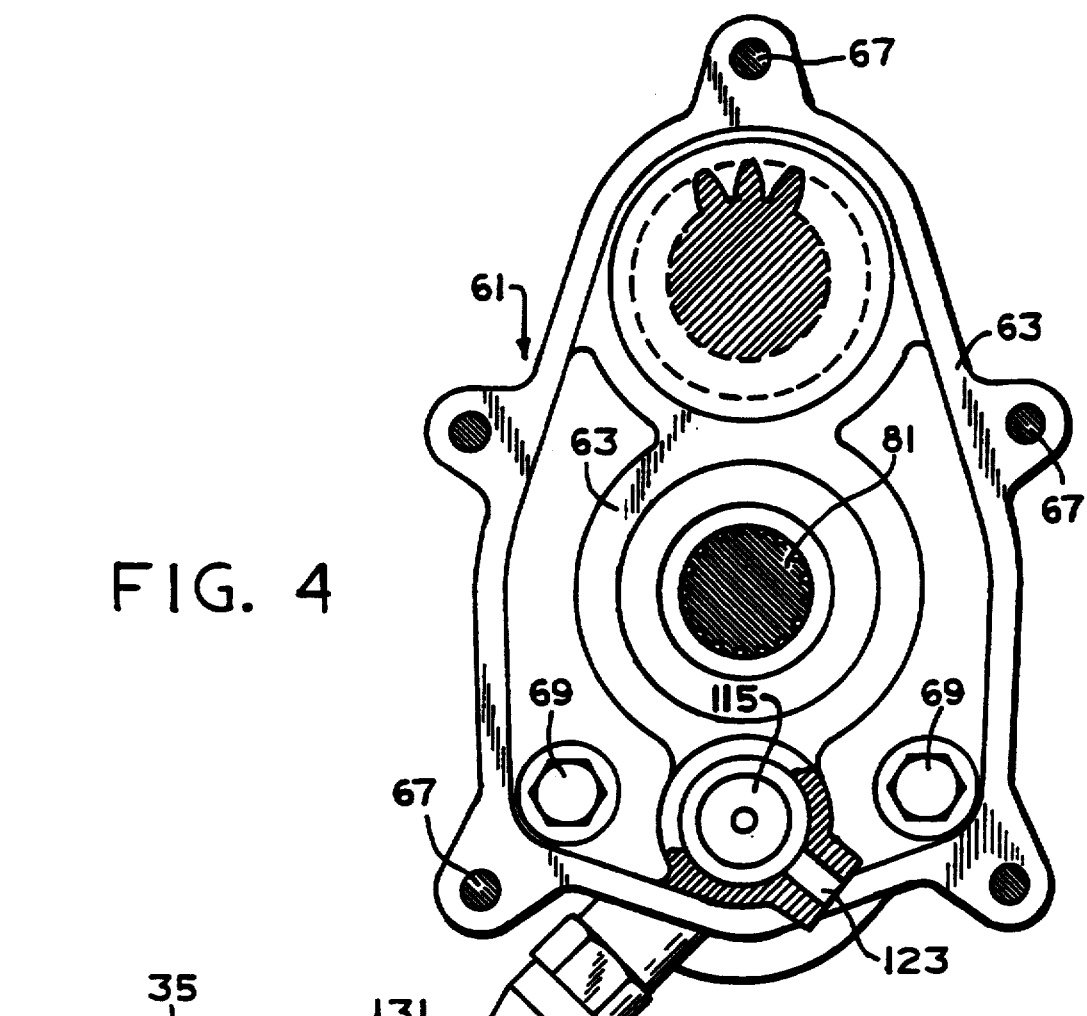
FIG. 4 is a transverse cross-section, taken on line 4—4 of FIG. 3, and on the same scale.

Referring now primarily to FIGS. 2-4, in conjunction with FIG. 1, a primary embodiment of the present invention will be described. Mounted to the rear wall portion 33 of the rear, auxiliary transmission section 15 is a power-take-off (PTO) assembly, generally designated 61 (shown in FIGS. 3 and 4). The PTO assembly 61 comprises a PTO housing, including a front housing section 63 and a rear housing section 65, the rear section 65 being attached to the front section 63 by means of a plurality of bolts 67, only one of which is shown in FIG. 3. The entire PTO assembly 61 is fixed to the rear wall portion 33 by means of a plurality of bolts 69 extending through the front housing section 63 into the wall portion 33, only one of the bolts 69 being shown in FIG. 3, but two others being shown in FIG. 4.

By comparing FIGS. 2 and 3, it should be understood that in FIG. 2, the PTO assembly 61 is shown only fragmentarily, with the intention of illustrating the relationship of the assembly 61 to the rest of the compound transmission 11. By way of contrast, FIG. 3 shows the PTO assembly in all of its detail, but shows the adjacent wall portion 33 only fragmentarily. To further facilitate an understanding of the present invention, it should be noted that FIG. 2 is taken on a generally "horizontal" plane, whereas FIG. 3 is taken on a vertical plane. As is well known to those skilled in the art, the portion shown in FIG. 2 as being a "horizontal" cross-section is not necessarily horizontal as that term would normally be understood, i.e., being parallel to the ground. Although the main shaft 31 and the countershafts 27 and 29 do define a plane, that plane is not truly "horizontal", but instead, the countershaft 27 is above the axis of the main shaft 31, while the countershaft 29 is below the axis of the main shaft 31.

Referring again primarily to FIG. 2, it may be seen that the rearward end portion of the countershaft 29 includes a reduced diameter portion 71 which is rotatably supported by the bearing set 37. Extending rearwardly from the reduced portion 71 is an externally splined portion 73 defining a central, cylindrical opening 75 (see FIG. 3). Disposed within the opening 75 is a set of needle bearings 77 which rotatably support a forward reduced diameter portion 79 of a PTO input shaft 81. The forward end of the main part of the shaft 81 defines a set of external splines 83 which are preferably substantially identical to the external splines on the portion 73. Surrounding the external splines 83 is an internally-splined clutch collar 85, the function of which will be described subsequently.

Referring now to FIGS. 2 and 3 together, the PTO input shaft 81 extends through an opening 87 defined by the rear wall portion 33. The PTO input shaft 81 is rotatably supported by a set of bearings 89 within a hub portion 91, which comprises part of the front housing section 63. Disposed at the rearward end of the PTO input shaft 81 is a PTO input gear 93 which is retained, axially, on the shaft 81 by means of a washer 95 and a bolt 97. In the subject embodiment, the PTO input gear 93 is a straight spur gear, although it will be understood by those skilled in the art that the particular type of gearing is not an essential feature of the present invention.

Referring now strictly to FIG. 3, in meshing engagement with the PTO input gear 93 is a PTO output gear 99, preferably having its axis of rotation oriented parallel to the axis of the PTO input shaft 81 and input gear 93. A forward end of the PTO output gear 99 is rotatably supported within a cylindrical opening defined by the front housing section 63, by means of a set of bearings 101. Similarly, a rearward end of the output gear 99 is rotatably supported within a cylindrical opening defined by the rear housing section 65, by means of a set of bearings 103. A PTO output yoke 105 is in splined engagement with the PTO output gear 99, and is retained thereon by means of a bolt 107.

It is desirable for the PTO assembly 61 to be usable when the vehicle is standing still, and therefore, it is well known to those skilled in the art to drive a PTO device from the countershaft of the front section of the transmission. However, as was described in the background of the disclosure, the need for some sort of engage/disengage control of the PTO device has typically resulted in a very large and cumbersome device, attached to the rear wall of the transmission. In accordance with one aspect of the present invention, the control of the engage/disengage of the PTO device occurs at least partially within the transmission 11, and more particularly, within the rear transmission section 15. However, in accordance with another aspect of the invention, the control for the engage/disengage function may still be an integral part of the PTO device itself.

Referring still primarily to FIG. 3, the front housing section 63 defines, integrally therewith, an axially-extending cylinder portion 109, which extends axially forwardly through the opening 87 in the rear wall portion 83. The cylinder portion 109 defines a cylindrical chamber 111 which is sealed, at its rearward end, by a plug member 113. Reciprocally, slidably disposed within the chamber 111 is a piston 115, including, formed integrally therewith, a piston rod 117 which extends forwardly out of the cylinder portion 109. At its forward end, the piston rod 117 is in engagement with a shift fork 119, which typically includes a generally U-shaped portion, adapted to be received with an annular groove 1 21 defined by the clutch collar 85. Alternatively, instead of the cylinder portion 109 being formed integrally with the housing section 63, the cylinder 109 could be formed as a separate element. This arrangement would make it possible to mount the cylinder 109 in the position shown in FIG. 3 in all applications, while being able to move the remainder of the PTO assembly 61 to different orientations, as different applications require.

Referring now to FIG. 4, in conjunction with FIG. 3, the front housing section 63 defines a port 123 which is in direct, open communication with the cylindrical chamber 111, at a location disposed axially between the plug member 113 and piston 115. The port 123 is typically connected to a source of pressurized air which is normally available on the type of truck which would be equipped with the compound transmission 11.

Normally, as the truck is being driven, and the PTO assembly 61 is not being operated, the clutch collar 85 is in the position shown in FIG. 3, because the piston 115 is biased to the position shown by means of a helical compression spring 125. In the position shown in FIG. 3, with the collar 85 disengaged from the external splines on the portion 73, the PTO input shaft 81 is not rotating, and no horsepower is being consumed by the PTO assembly 61. When it is desired to operate the PTO, pressurized air is communicated through the port 123 into the chamber 111, biasing the piston 115 forwardly, in opposition to the force of the spring 125. Forward (i.e., to the left in FIG. 3) movement of the piston rod 117 and the shift fork 119 slides the collar 85 forwardly until it engages the external splines on both the portion 73 and the input shaft 81, thus locking the shaft 81 to the countershaft 29. As will be understood by those skilled in the art, it is first necessary for the vehicle operator to disengage the vehicle master clutch, such that the input shaft 19 and countershafts 27 and 29 stop turning, thus making it possible to slide the collar 85 forward and achieve the above-described spline engagement.

Thereafter, the operator again engages the master clutch such that the input shaft 19 and the countershafts 27 and 29 again begin to rotate. The shaft 81 then rotates at the speed of rotation of the countershaft 29, as does the PTO input gear 93. However, in the subject embodiment, the PTO output gear 99 has a pitch diameter which is smaller than that of the input gear 93, by a ratio of approximately 2:1, such that the PTO output yoke 105 rotates at approximately twice the speed of rotation of the input shaft 81. Obviously, the particular speed ratio illustrated in FIG. 3 is not an essential feature of the present invention, and depending upon the particular PTO application, the gearing within the PTO assembly 61 could provide a direct, 1:1 drive ratio, or could have the output speed stepped down, or could have the output speed stepped up, as shown in FIG. 3.

Referring still primarily to FIGS. 3 and 4, associated with the front housing section 63 is a switch assembly, generally designated 127, including a radially moveable contact element 129. The element 129 is normally biased into engagement with the piston 115 and, in the position shown in FIG. 3, would be out of position to complete the circuit of which the switch assembly 127 is one of the inputs. Whenever pressure is communicated into the chamber 11, to engage the clutch collar 85, the contact element 129 is biased toward a position in which electrical contact occurs, thus providing an appropriate electrical signal over a pair of electrical leads 131 (see FIG. 4). Typically, the signal from the switch 127 is transmitted to a device in the operator's cab, such as a signal light or warning buzzer, to make sure that the vehicle operator is aware of the engagement of the PTO device, primarily as a safety precaution.

FIG. 5 EMBODIMENT

Referring now primarily to FIG. 5, there is illustrated an alternative embodiment of the invention. In FIG. 5, the reduced diameter portion 71 of the countershaft 29 is replaced with a reduced diameter portion 133 which, in a similar manner, is rotatably supported within the bearing set 37. However, the portion 133 defines a set of internal threads, and in threaded engagement therewith is a set of external threads 135 defined by a forward portion of an adaptor member 137. In the same manner as the primary embodiment, the adaptor member 137 defines a set of external splines which are substantially identical to the external splines 83 on the forward end of the PTO input shaft 81.

Recognizing that many transmissions are never equipped with a PTO device, it is the intention of the embodiment shown in FIG. 5 to provide, as a standard feature on each transmission, the internally threaded, reduced diameter portion 133 on the rearward end of the countershaft 29. If it is later desired to add PTO capability to a particular transmission, the adaptor member 137 is simply threaded into the portion 133, and then the PTO input shaft 81 is inserted in the position shown in FIG. 5. It will be appreciated by those skilled in the art that the orientation of the external threads 135, and the mating internal threads, should be such that the transmission of torque from the countershaft 29 to the PTO input shaft 81 tends to tighten the threaded engagement, rather than tending to disengage the threads.

FIG. 6 EMBODIMENT

Figure 6:
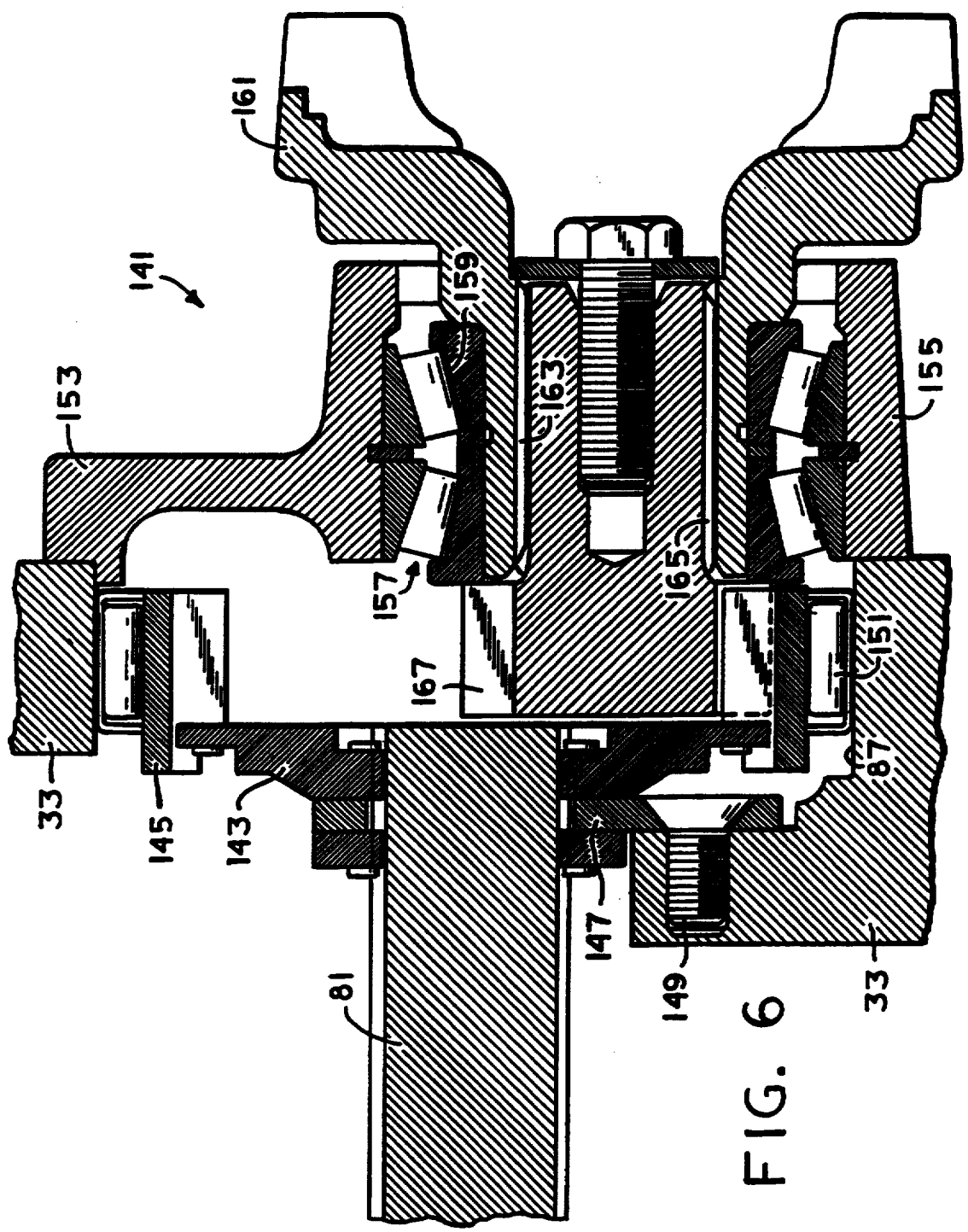
FIG. 6 is a fragmentary, axial cross-section, similar to FIG. 3, illustrating an alternative embodiment of the PTO device of the present invention.

Referring now primarily to FIG. 6, there will be described an alternative embodiment of the PTO device. The PTO device, generally designated 141, may be mounted to the rear wall portion 33 in the same general manner as in the earlier embodiment. Similarly, the PTO input shaft 81 may be clutched to the front section countershaft 29 in the same manner as described previously.

In the FIG. 6 embodiment, splined to the rearward end of the PTO input shaft 81 is an annular drive washer 143, which is in splined engagement at its outer periphery with an internally-toothed ring gear 145. Disposed adjacent the drive washer 143 is a locating washer 147 which is fixed relative to the rear wall portion 33 by means of a plurality of flat-head machine screws 149 (only one of which is shown in FIG. 6).

Disposed radially between the rotating ring gear 145 and the stationary wall portion 33 is a roller bearing set 151. Attached to the rearward surface of the wall portion 33 by any suitable means (not shown) is a PTO housing section 153. Disposed within an annular hub portion 155 of the housing section 153 is a pair of tapered roller bearing sets 157 and 159. The bearing sets 157 and 159 rotatably support a forward cylindrical portion of a PTO output yoke 161.

In splined engagement with a set of internal splines 163 is a set of external splines 165 defined by a rearward, cylindrical portion of a PTO pinion gear 167. In a manner generally well known in the gearing art, the pinion gear 167 is in toothed engagement with the ring gear 145, and in the subject embodiment, provides a gear train from the input to the output, which results in a speed increase. By way of example only, the pitch diameter of the ring gear 145 is approximately twice the pitch diameter of the pinion gear 167, and therefore, the engagement thereof provides approximately a 2:1 speed increase from the input shaft 81 to the output yoke 161.

It may be seen that the embodiment of FIG. 6 provides a PTO device which is especially compact, and in addition, provides a relatively simple speed increase gear train from the input to the output. Furthermore, with the PTO device 141 of the FIG. 6 embodiment, it would be fairly simple, in the field, to replace the pinion gear 167 and housing section 153 with a different housing section and pinion gear, wherein the pinion gear would have a different pitch diameter, and the axis of the annular hub portion 155 of the housing section would be correspondingly located differently, thus providing a PTO device having a different gear ratio, without ever disturbing the ring gear 145 and the associated structure.

It should also be noted in FIG. 6 that with both the ring gear 145 and the pinion gear 167 located in the position shown, substantially all of the gear reaction forces act in a plane which lies in the rear wall portion 33. As a result, the liklihood of damage to the PTO device 141 is substantially reduced. In the past, there have been instances where the gear reaction forces in the PTO device have applied sufficient force to the PTO housing to break the bolts connecting the housing to the transmission. In the PTO device 141, the only forces which are applied at a location axially beyond the rear wall portion 33 are those between the internal splines 163 and the external splines 165.

It is a further advantage of the PTO device 141 that it may readily be configured such that no separate lubrication pump is required. As is well known to those skilled in the art, in the typical PTO device, the configuration is such that the PTO housing inherently defines a sump region in which fluid tends to stagnate, and can become overheated as a result of gear mesh. However, the configuration of the PTO device 141, utilizing the ring gear 145, is such that no inherently stagnant fluid regions are defined, and the PTO device 141 may be readily lubricated by communicating lubricant from the front, main transmission section 13 into the PTO device 1 41 by any suitable means, well known to those skilled in the art.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A compound change gear transmission comprising a change gear main transmission section connected in series with an auxiliary transmission section; one of said main and auxiliary transmission sections comprising a front section, and the other of said main and auxiliary transmission sections comprising a rear section; said front section comprising a transmission input shaft, and at least one countershaft, constantly driven by said transmission input shaft; and said rear section comprising a transmission output shaft rotatably disposed within a rear section housing, said rear section housing including a rear wall portion; a power-take-off device mounted to said rear wall portion, and adapted to receive input torque from said front section countershaft; characterized by:

(a) said power-take-off device including a power-take-off input shaft extending generally axially, through said rear wall portion, and including a forward end portion, disposed adjacent a rearward end portion of said front section countershaft;

(b) clutch means operably associated with said rearward end portion of said front section countershaft and said forward end portion of said power-take-off input shaft, and movable between a first position (FIG. 3) permitting relative rotation between said countershaft and said power-take-off input shaft, and a second position connecting said power-take-off input shaft for rotation with said countershaft; and (c) said power-take-off device including actuator means extending through said rear wall portion, operably associated with said clutch means and operable in response to the presence of an input signal to move said clutch means from said first position to said second position.

2. A compound change gear transmission as claimed in claim 1, characterized by said change gear main transmission section comprising said front section; and said front section comprising a pair of countershafts, approximately oppositely disposed about said transmission input shaft.

3. A compound change gear transmission as claimed in claim 1, characterized by said power-take-off device including a power-take-off housing adapted to be fixed to said rear wall portion, and a power-take-off output member rotatably mounted within said power-take-off housing.

4. A compound change gear transmission as claimed in claim 3, characterized by a gear train disposed between said power-take-off input shaft and said power-take-off output member, said input shaft and said output member being transversely offset from each other.

5. A compound change gear transmission as claimed in claim 4, characterized by said gear train comprises a speed increase gear train, whereby the speed of rotation of said power-take-off output member is greater than the speed of rotation of said power-take-off input shaft.

6. A compound change gear transmission as claimed in claim 1, characterized by said front section countershaft and said power-take-off input shaft are substantially coaxial, and said clutch means comprises said rearward end portion of said front section countershaft defining a first set of external splines, and said forward end portion of said power-take-off input shaft defining a second set of external splines.

7. A compound change gear transmission as claimed in claim 6, characterized by said clutch means further comprises a clutch member defining a set of internal splines; said clutch member, in said first position, being in engagement with only said second set of external splines, and in said second position, being in engagement with both said first and second sets of external splines.

8. A compound change gear transmission as claimed in claim 1, characterized by said actuator means comprises a piston-cylinder arrangement, and said input signal comprises pressurized air.

9. A compound change gear transmission as claimed in claim 8, characterized by said power-take-off device including a power-take-off housing, a portion of said power-take-off housing defining said cylinder, and said cylinder extending generally axially through said transmission rear wall portion; said piston-cylinder arrangement further comprising a piston member disposed within said cylinder and including a piston rod member extending axially out of said cylinder, and being operably associated with said clutch means.

10. A compound change gear transmission as claimed in claim 1, characterized by said front section countershaft and said rearward end portion defining a first set of threads, and said rearward end portion further comprising an adaptor member operably associated with said clutch means, said adaptor member defining a second set of threads adapted for threaded engagement with said first set of threads defined by said rearward end portion of said countershaft.

11. A compound change gear transmission as claimed in claim 10, characterized by said front section countershaft having a normal direction of rotation, and said first set of threads defined by said countershaft and said second set of threads defined by said adaptor member being oriented whereby rotation of said countershaft in said normal direction of rotation tends to increase said threaded engagement.

12. A compound change gear transmission comprising a change gear main transmission section connected in series with an auxiliary transmission section; one of said main and auxiliary transmission sections comprising a front section, and the other of said main and auxiliary transmission sections comprising a rear section; said front section comprising a transmission input shaft, and at least one countershaft constantly driven by said transmission input shaft; and said rear section comprising a transmission output shaft rotatably disposed within a rear section housing, said rear section housing including a rear wall portion; a power-take-off device mounted to said rear wall portion, and adapted to receive input torque from said front section countershaft; characterized by:

(a) said power-take-off device including a power-take-off input shaft extending generally axially, through said rear wall portion, and including a forward end portion, disposed adjacent a rearward end portion of said front section countershaft and defining a first set of threads;

(b) an adaptor member defining a second set of threads in threaded engagement with first set of threads defined by said rearward end portion, said adaptor member being operatively associated with said power-take-off input shaft;

(c) clutch means operably associated with said power-take-off input shaft, and movable between a first position (FIG. 3) permitting relative rotation between said countershaft and said power-take-off input shaft, and a second position connecting said power-take-off input shaft for rotation with said countershaft; and (d) said power-take-off device including actuator means operably associated with said clutch means and operable in response to the presence of an input signal to move said clutch means between said first position and said second position.

13. A compound change gear transmission as claimed in claim 12, characterized by said change gear main transmission section comprising said front section; and said front section comprising a pair of countershafts, approximately oppositely disposed about said transmission input shaft.

14. A compound change gear transmission as claimed in claim 12, characterized by said front section countershaft and said power-take-off input shaft being substantially coaxial, and said clutch means comprising said adaptor member defining a first set of external splines, and said forward end portion of said power-take-off input shaft defining a second set of external splines.

15. A compound change gear transmission as claimed in claim 14, characterized by said clutch means further comprising a clutch member defining a set of internal splines; said clutch member, in said first position, being in engagement with only said second set of external splines, and in said second position, being in engagement with both said first and second sets of external splines.

16. A compound change gear transmission as claimed in claim 12, characterized by said front section countershaft having a normal direction of rotation, and said first set of threads defined by said rearward end portion, and said second set of threads defined by said adaptor member being oriented whereby rotation of said countershaft in said normal direction of rotation tends to increase said threaded engagement.

17. A compound change gear transmission as claimed in claim 16, characterized by said adaptor member defining a central opening, and said power-take-off input shaft includes a reduced diameter portion rotatably received within said opening defined by said adaptor member.

18. A compound change gear transmission comprising a change gear main transmission section connected in series with an auxiliary transmission section; one of said main and auxiliary transmission sections comprising a front section, and the other of said main and auxiliary transmission sections comprising a rear section; said front section comprising a transmission input shaft, and at least one countershaft constantly driven by said transmission input shaft; and said rear section comprising a transmission output shaft rotatably disposed within a rear section housing, said rear section housing including a rear wall portion; a power-take-off device mounted to said rear wall portion, and adapted to receive input torque from said front section countershaft; characterized by:

(a) said power-take-off device including a power-take-off input shaft extending generally axially, through said rear wall portion, and including a forward end portion, disposed adjacent a rearward end portion of said front section countershaft;

(b) clutch means operably associated with said power-take-off input shaft, and movable between a first position (FIG. 3) permitting relative rotation between said countershaft and said power-take-off input shaft, and a second position connecting said power-take-off input shaft for rotation with said countershaft;

(c) said power-take-off device including actuator means operably associated with said clutch means and operable in response to the presence of an input signal to move said clutch means from said first position to said second position; and (d) said power-take-off device further comprising a power-take-off output member, and a gear train disposed in series between said power-take-off input shaft and said power-take-off output member, said gear train comprising an input gear and an output gear, said input and output gears having different pitch diameters.

19. A compound change gear transmission as claimed in claim 18, characterized by said input gear having a larger pitch diameter than said output gear, whereby said gear train comprises a speed-up gear train.

20. A compound change gear transmission as claimed in claim 18, characterized by said input gear comprising an internally-toothed ring gear, and said output gear comprising an externally-toothed pinion gear, in meshed engagement with said ring gear.

21. A compound change gear transmission as claimed in claim 20, characterized by said ring gear being fixed to rotate with said power-take-off input shaft, and said pinion gear being rotatable about an axis fixed relative to a power-take-off housing.

22. A compound change gear transmission as claimed in claim 21, characterized by said ring gear being rotatably disposed within an opening defined by said rear wall portion, and said power-take-off housing being disposed immediately adjacent said rear wall portion, and supporting said power-take-off output member therein.

23. A compound change gear transmission comprising a change gear main transmission section connected in series with an auxiliary transmission section; one of said main and auxiliary transmission sections comprising a front section, and the other of said main and auxiliary transmission sections comprising a rear section; said front section comprising a transmission input shaft, and at least one countershaft constantly driven by said transmission input shaft; and said rear section comprising a transmission output shaft rotatably disposed within a rear section housing, said rear section housing including a rear wall portion; a power-take-off device mounted to said rear wall portion, and adapted to receive input torque from said front section countershaft; characterized by:
- (a) said power-take-off device including a power-take-off input shaft extending generally axially toward an opening defined by said rear wall portion, and including a forward end portion, disposed adjacent a rearward end portion of said front section countershaft;
- (b) said power-take-off device comprising a power-take-off output member, and a gear train disposed in series between said power-take-off input shaft and said power-take-off output member, said gear train comprising an internally-toothed ring gear disposed within said opening defined by said rear wall portion, and an externally-toothed pinion gear, in meshed engagement with said ring gear;
- (c) said ring gear being fixed to rotate with said power-take-off input shaft, and said pinion gear being rotatable about an axis fixed relative to a power-take-off housing whereby the gear reaction forces between said ring gear and said pinion gear act in a plane which lies in said rear wall portion.

* * * * *